June 1, 1965 J. J. FINN 3,187,161
IMMERSION HEATER CONTROL
Filed June 11, 1963
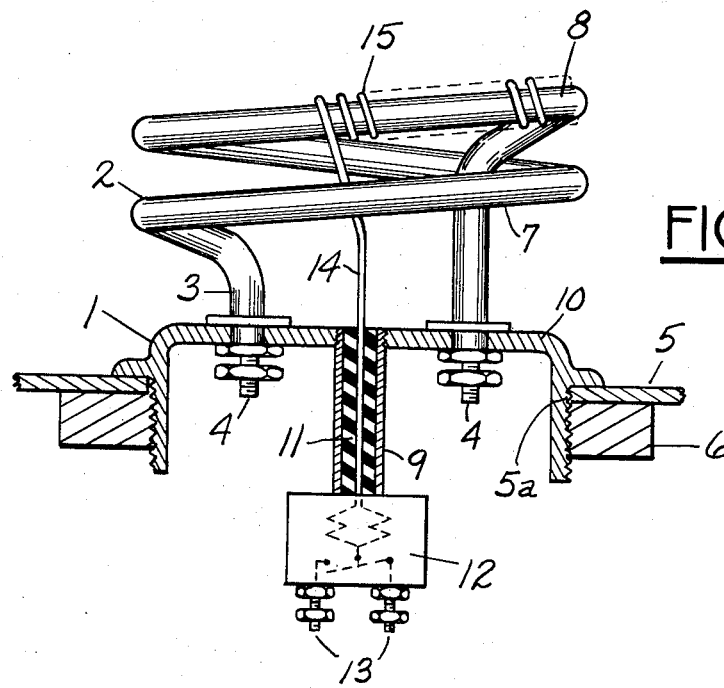
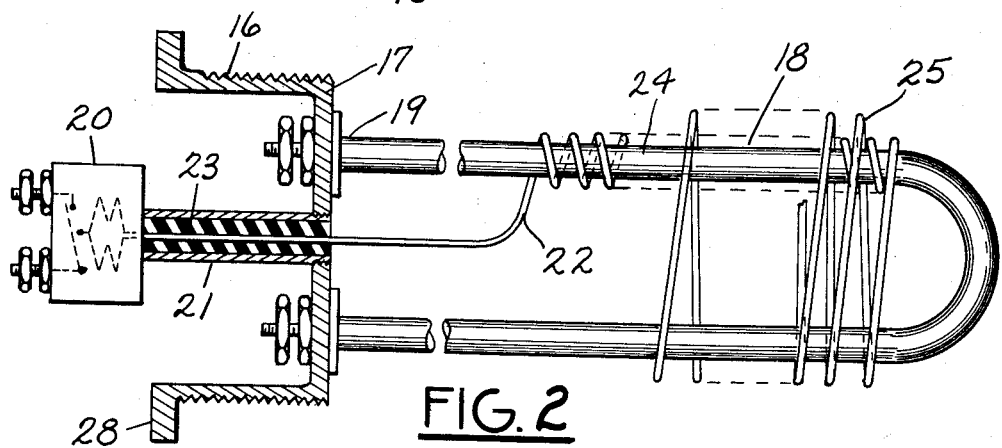
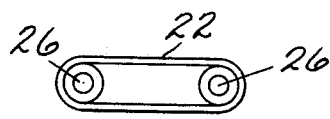
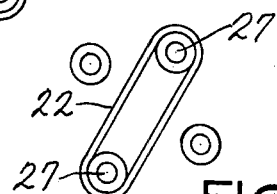
INVENTOR.
John J. Finn
BY Ralph Hammar
Attorney

# United States Patent Office 3,187,161
Patented June 1, 1965

3,187,161
IMMERSION HEATER CONTROL
John J. Finn, Erie, Pa., assignor of one-half to Glenn Electric Heater Corporation, Erie, Pa., a corporation of Pennsylvania
Filed June 11, 1963, Ser. No. 287,154
4 Claims. (Cl. 219—331)

This invention is intended to improve the burn out protection of immersion heaters upon low liquid level. In a preferred form, the heater control switch is mounted directly upon the heater base and is actuated by thermal expansion of liquid in a small diameter (capillary) tube wrapped around the uppermost section of the heating element. Upon low liquid level, exposure of the uppermost section of the heating element causes local overheating and the resultant expansion of the liquid in the capillary tube operates the heater control switch to interrupt the heater circuit and thereby prevent burn out.

In the drawing, FIG. 1 is a sectional elevation of a bottom mounted immersion heater, FIG. 2 is a sectional elevation of a single loop horizontal heater, and FIGS. 3 and 4 are diagrammatic views showing other arrangements of the heat responsive capillary tubing.

The urn type heater of FIG. 1 has a base 1 carrying a sheathed heating element 2 having its sheath 3 sealed to the inside of the base and having its input and output terminals 4 accessible from the outside of the base. The base is suitably mounted in an opening 5a on the bottom wall 5 of an urn or boiler and is clamped in sealing engagement with the bottom wall by a nut 6. The heating element is coiled in several turns 7 arranged so that sections 8 at the highest level and are, therefore, the first to be exposed upon low liquid level.

When mounted on the bottom wall of the urn, the terminals 4 are accessible for wiring to a power circuit. A nipple 9 is screwed into the wall 10 of the base and is potted with a suitable sealing compound 11 (e.g. epoxy resin). On the lower end of the nipple is a thermostat 12 having terminals 13 for connection in the power or control circuit of the heater.

The thermostat 12 is actuated by the expansion of a thermally responsive liquid filling a small bore or capillary tube 14. When heated above predetermined temperature, the liquid develops sufficient pressure on the diaphragm of the thermostat 12 to actuate the thermostat to interrupt the power circuit to the heater. This type of thermostat is well known and need not be further described.

The tube 14 extends from the thermostat 12 through the nipple 9 and wall 10 into the interior of the urn and is wrapped around sections 8 of the heating element in a plurality of turns 15. In the event of low liquid level, the sections 8 quickly overheat and cause expansion and even vaporization of the liquid fill of the turns 15 of the tube, thereby developing sufficient pressure to actuate the thermostat 12 to open the power circuit and prevent burn out of the heating element. Complete coverage is obtained of the sections 8 because the turns are wrapped directly around these sections. The small diameter of the tube 14 and the resultant small volume of liquid to be heated insures quick response to local overheating. The small diameter of the tube 14 also permits the use of a liquid fill which would vaporize at temperatures above the normal operating temperature. Local vaporization at the hot spots in the coils 15 speeds up the response without developing sufficient pressure to damage the thermostat 12. With a larger diameter tube such as the usual thermostat bulbs, vaporization would develop excessive pressure, causing rupture of the diaphragm of the thermostat 12.

The thermostat 12 is solidly mounted on one end of the nipple 9 and is within the outside diameter of the clamping nut 6, thus permitting the use of socket wrenches to tighten the nut. This also permits assembly of the thermostat on the base 1 prior to mounting of the heating element in the urn. As the base 1 is lowered through the opening 5a in the bottom wall 5 of the urn, the thermostat 12 easily passes through the opening because it is within the outside diameter of the base.

The potting compound 11 need withstand only the normal liquid temperature in the urn and need not withstand the higher temperature resulting from low liquid level. Even if there should be local overheating of the compound 11, the thermal gradient would limit the overheating to the section of the nipple adjacent the liquid and enough of the compound would remain to prevent leakage.

The thermostat 12 and the associated nipple 9 and tube 14 constitute a complete unit which is easily replaced in the field. The damaged unit is removed by unscrewing the nipple. A new unit can then be screwed into the heater base.

FIG. 2 shows a horizontal immersion heater having a base 16 screwed into a side wall of a boiler or the like. Extending horizontally from the bottom wall 17 of the base is a looped heating element 18 having its sheath 19 sealed to the bottom wall 17. The immersion heaters must be kept immersed in the liquid being heated. If the liquid level drops, the exposed portion of the heater quickly overheats and burns out. Low liquid level burn out is prevented by a thermostatic switch 20 mounted on a nipple 21 screwed into the bottom wall 17. Extending through the nipple 21 is a capillary tube 22 surrounded by a sealing compound 23. The capillary tube is wrapped around the uppermost section 24 of the heating element and upon low liquid level, the overheating of the sheath of the heating element causes rapid expansion of the liquid within the capillary tube 22 and operation of the thermostatic switch 20 to interrupt the circuit.

In addition to wrapping the tube 22 about the uppermost leg of the heating element, the excess length 25, if any, is wrapped around the entire heating element. The protection provided by the section 25 of the tube is not as fast in response as the protection provided by the section of the tube wrapped around the uppermost leg 24 of the heating element. However, the section 25 does provide protection in case the heating element is improperly installed so that the leg 24 is not uppermost.

FIGS. 3 and 4 show alternative arrangements for wrapping the capillary tube 22. In FIG. 3, the capillary tube is wrapped around two adjacent legs 26 of the heating element. In FIG. 4, the capillary tube 22 is wrapped around two diagonally disposed legs 27 of the heating element.

In all forms of the invention, the thermostatic switch is solidly mounted on the supported nipple screwed into the base of the heating element. Since the switch is of smaller diameter than the base of the heating element, it will pass through any hole in which the base of the heating element is to be mounted. This simplifies the initial installation and service in the field. The thermostatic switch is supported by the base of the heating element. There is no need to provide external supports for the thermostatic switch. The use of the small diameter or capillary tube provides faster response due to the small volume of liquid to be heated. The wrapping of the capillary tube about the uppermost section of the heating element provides complete coverage at the points at which overheating first occurs at low liquid level. The small volume of liquid in the capillary tube also permits the use of lower temperature liquids which would vaporize at the temperatures occurring upon overheating. With large volumes of liquid, the vapor presure would rupture the diaphragm in the thermostatic switch. There are higher temperature liquids which do not vaporize at the temperatures encountered in overheating, but these higher temperature liquids have a slower response and are, therefore, not as satisfactory.

Another advantage of the control is that socket wrenches may be used for installation of the heating element because the thermostatic switch lies within the outside diameter of the nut 6 of FIG. 1 or the nut 28 of FIG. 2.

What is claimed as new is:

1. A liquid heater comprising a vessel containing liquid to be heated, said vessel having a wall with a submerged opening, a base closing said opening having its inner side presented to the interior of the vessel and its outer side presented to the exterior of the vessel, a heating element having a sheath sealed to the inner side of the base and terminals accessible from the outside of the base, a nipple screwed into the outer side of the base, a thermostat mounted on the outer end of the nipple and having terminals for connection into a control circuit for the heating element, a capillary tube containing a thermally responsive liquid extending from the thermostat through the nipple and base and wrapped around the uppermost part of said sheath whereby thermally responsive liquid in the tube is heated to operate the thermostat upon low liquid level exposing the uppermost part of said sheath, and a sealing compound filling the nipple around the tube.

2. A liquid heater comprising a vessel containing liquid to be heated, said vessel having a wall with a submerged opening and a removable closure for said opening, a heating element having a sheath sealed to the closure and projecting into the vessel and having terminals accessible from the outside of the closure, a nipple on the closure having its inner end presented to the interior of the vessel and its outer end presented to the exterior of the vessel, a heater control thermostat mounted on the outer end of the nipple, a capillary tube containing a thermally responsive liquid extending from the thermostat through the nipple and base and wrapped around the uppermost part of said sheath whereby the thermally responsive liquid in the tube is heated to operate the thermostat upon low liquid level exposing the uppermost part of said sheath, and a sealing compound filling the nipple around the tube.

3. An immersion liquid heater having a base with its inner side presented to the liquid and its outer side exposed, a heating element having a sheath sealed to the inner side of the base, a nipple sealed into the base having its inner end open to the inner side of the base and its outer end exposed, a thermostat mounted on said outer end of the nipple within the outside diameter of the base, a capillary tube containing a thermally responsive liquid extending from the thermostat through the nipple and base and wrapped around the uppermost part of said sheath whereby the thermally responsive liquid in the tube is heated to operate the thermostat upon low liquid level exposing the uppermost part of said sheath, and a sealing compound filling the nipple around the tube.

4. A liquid heater comprising a vessel containing liquid to be heated, said vessel having a wall with a submerged opening, a base closing said opening having its inner side presented to the interior of the vessel and its outer side presented to the exterior of the vessel, a heating element having a sheath sealed to the inner side of the base and terminals accessible from the outside of the base, a nipple screwed into the outer side of the base, a thermostat mounted on the outer end of the nipple and lying within the outside diameter of the base, a capillary tube containing a thermally responsive liquid extending from the thermostat through the nipple and base and wrapped around the uppermost part of said sheath whereby the thermally responsive liquid in the tube is heated to operate the thermostat upon low liquid level exposing the uppermost part of said sheath, and a sealing compound filling the nipple around the tube.

References Cited by the Examiner

UNITED STATES PATENTS

| 1,712,653 | 5/29 | Egloff. | |
| 1,930,551 | 10/33 | Blashfield | 219—331 |
| 2,852,656 | 9/58 | Kendon | 219—316 |
| 2,880,300 | 3/59 | Reimers et al. | 219—324 |
| 2,977,454 | 3/59 | Volker | 219—331 |
| 3,134,008 | 5/64 | Finn | 219—523 |

RICHARD M. WOOD, *Primary Examiner.*
ANTHONY BARTIS, *Examiner.*